United States Patent
Dicke

(10) Patent No.: US 12,194,757 B2
(45) Date of Patent: Jan. 14, 2025

(54) METHOD FOR PRODUCING AT LEAST ONE CARRIER MATERIAL PROVIDED WITH A PRINTED DECORATION

(71) Applicant: Flooring Technologies Ltd., Kalkara (MT)

(72) Inventor: Sebastian Dicke, Bantikow (DE)

(73) Assignee: Flooring Technologies Ltd., Kalkara (MT)

( * ) Notice: Subject to any disclaimer, the term of this patent is extended or adjusted under 35 U.S.C. 154(b) by 112 days.

(21) Appl. No.: 17/798,575

(22) PCT Filed: Feb. 2, 2021

(86) PCT No.: PCT/EP2021/052396
§ 371 (c)(1),
(2) Date: Aug. 10, 2022

(87) PCT Pub. No.: WO2021/160469
PCT Pub. Date: Aug. 19, 2021

(65) Prior Publication Data
US 2023/0124632 A1    Apr. 20, 2023

(30) Foreign Application Priority Data

Feb. 11, 2020  (EP) ..................... 20156613

(51) Int. Cl.
| | | |
|---|---|---|
| *C09D 11/40* | (2014.01) | |
| *B41J 2/21* | (2006.01) | |
| *B41M 5/00* | (2006.01) | |
| *C09D 11/322* | (2014.01) | |
| *B41M 3/06* | (2006.01) | |

(52) U.S. Cl.
CPC ........... *B41J 2/2107* (2013.01); *C09D 11/322* (2013.01); *C09D 11/40* (2013.01); *B41M 3/06* (2013.01); *B41M 5/0023* (2013.01)

(58) Field of Classification Search
CPC ...... B41J 2/2107; C09D 11/322; C09D 11/40; B41M 3/06; B41M 5/0023
See application file for complete search history.

(56) References Cited

U.S. PATENT DOCUMENTS

| | | |
|---|---|---|
| 2011/0117340 A1 | 5/2011 | Oldorff |
| 2014/0255670 A1 | 9/2014 | Kalwa |
| 2014/0349087 A1 | 11/2014 | Jung et al. |
| 2016/0214395 A1 | 7/2016 | Torfs et al. |
| 2017/0297354 A1 * | 10/2017 | Van Den Bergen ... B41M 7/009 |
| 2020/0207118 A1 | 7/2020 | Lenaerts et al. |

FOREIGN PATENT DOCUMENTS

| | | | |
|---|---|---|---|
| CN | 104302714 A | 1/2015 | |
| CN | 107107637 A | 8/2017 | |
| EP | 2623567 A1 | 8/2013 | |
| EP | 2774770 B1 | 4/2015 | |
| EP | 2865528 A1 | 4/2015 | |
| EP | 2980313 A1 | 2/2016 | |
| EP | 3447098 A1 | 2/2019 | |
| EP | 3521048 A1 | 8/2019 | |
| EP | 3757178 B1 | 9/2021 | |
| JP | 2000186244 A | 7/2000 | |
| WO | 2010112125 A1 | 10/2010 | |
| WO | WO-2019149517 A1 * | 8/2019 | ............. B41M 3/06 |

* cited by examiner

*Primary Examiner* — Yaovi M Ameh
(74) *Attorney, Agent, or Firm* — The Webb Law Firm

(57) ABSTRACT

Provided is a method for producing at least one carrier material provided with a print decoration. The print decoration is applied to the at least one carrier material by means of digital printing. The water-soluble CRYK ink used for the digital printing has the following composition: Colour component C: at least one cyan pigment; Colour component K: at least one black carbon pigment; Colour component Y: at least one yellow pigment; or a mixture of at least two different yellow pigments or a mixture of at least one yellow pigment and at least one red pigment; and Colour component R: at least one red pigment, or a mixture of at least two different red pigments or a mixture of at least one red pigment and at least one yellow pigment.

18 Claims, No Drawings

METHOD FOR PRODUCING AT LEAST ONE CARRIER MATERIAL PROVIDED WITH A PRINTED DECORATION

CROSS-REFERENCE TO RELATED APPLICATIONS

This application is the United States national phase of International Application No. PCT/EP2021/052396 filed Feb. 2, 2021, and claims priority to European Patent Application No. 20156613.0 filed Feb. 11, 2020, the disclosures of which are hereby incorporated by reference in their entirety.

BACKGROUND OF THE INVENTION

Field of the Invention

The disclosure relates to a method for producing a carrier material provided with a printed decoration, in particular a printed paper or a printed material board, using a water-soluble digital printing ink.

Description of Related Art

Decorated carrier materials, such as wood-based panels, are typically used as flooring elements or for cladding walls and ceilings. In the past, the wood-based panels used as carrier materials were usually coated with a decorative paper, whereby there were and are no limits to the variety of different patterned decorative papers.

As an alternative to the use of decorative papers on wood-based panels, direct printing on wood-based panels as substrates has developed in the past, as printing on paper and its subsequent lamination or direct coating on the wood-based panel is no longer necessary.

The main printing techniques used are gravure printing and digital printing. Gravure printing is a printing technique in which the elements to be reproduced are present as depressions in a printing forme that is inked before printing. The ink is mainly located in the depressions and is transferred to the object to be printed, e.g. a carrier material, due to the contact pressure of the printing forme and adhesion forces. In digital printing, on the other hand, the printed image is transferred directly from a computer to a printing machine such as a laser printer or inkjet printer. This eliminates the use of a static printing form.

However, in the context of the technical development of the printing technology of a wide variety of carrier materials, digital printing is being used more and more. While digital printing processes were initially used primarily in the graphic arts industry, e.g. advertising agencies, advertising material manufacturers or printers, it is now becoming apparent that digital printing processes are also being used more frequently in other branches of industry. There are many reasons for this, but two main arguments can be identified. Digital printing enables the production of a print image with a particularly high quality due to a higher resolution and also allows a broader range of applications with a high degree of flexibility.

Today, digital printing is carried out almost exclusively using the CMYK colour system. The CMYK colour model is a subtractive colour model, whereby the abbreviation CMYK stands for the three colour components cyan, magenta, yellow and the black component key as colour depth. With this colour system, a colour space (gamut) can be reproduced that meets many requirements from various areas.

Nevertheless, the CMYK colour space is a compromise that leads to the fact that certain colours either cannot be produced at all or the use of additional colours is necessary. This problem arises particularly in the reproduction of wood decors in the furniture or laminate flooring industry, where different shades of brown have to be produced.

SUMMARY OF THE INVENTION

The technical object underlying the proposed solution was therefore to provide a method for producing decorative prints on different carrier materials with the same quality or comparable quality appearance while avoiding metamerism, whereby a good reproduction of warm-looking wood decors is ensured on all carrier materials.

This object is solved by a method with features as described herein.

Accordingly, a method for producing at least one carrier material provided with a print decoration is provided, wherein the print decoration is applied to the at least one carrier material by means of digital printing, e.g. in an inkjet printing process.

According to the solution, the ink used for digital printing is a water-soluble CRYK ink having the following composition:
Colour component C: at least one cyan pigment;
Colour component K: at least one black carbon pigment;
Colour component Y: at least one yellow pigment; or a mixture of at least two different yellow pigments or a mixture of at least one yellow pigment and at least one red pigment.
Colour component R: at least one red pigment, or a mixture of at least two different red pigments, or a mixture of at least one red pigment and at least one yellow pigment;
wherein a CRYK ink with only one yellow pigment as colour component Y and only one red pigment as colour component R is excluded.

Accordingly, the present method uses a digital printing ink in which, for example, only the colour component Y, only the colour component R or also both colour components Y and R are modified. In particular, the magenta usually used in inkjet inks has been replaced by a colour component R in the form of a mixture of red colour pigments and a yellow colour pigment, and the colour component Y has been replaced by a mixture of yellow colour pigments and a red colour pigment. The digital printing ink sets always consist of only 4 colours, as this is due to the digital printer. Nevertheless, it became possible to customise digital printing inks by mixing different colour pigments and using them in a digital printing ink. It should be noted that the use of an orange pigment such as PO71 is not intended and is therefore excluded.

With this ink composition, it is now possible to provide decors on various carrier materials that are shifted in the colour space towards orange-red.

The present method makes it possible to provide decorative papers for furniture, floor panels and high pressure laminates and laminate panels with the same decor and colour effect, i.e. furniture, floor and edges in a matching decor and colour scheme.

EP 2 865 528 B1 describes the use of a CRYK ink for printing on a paper substrate. In addition to a cyan pigment and a carbon black pigment, this CRYK ink contains the red pigment PR 254 as ink component R and the yellow pigment PY151 as ink component Y. However, the use of mixtures as colour component R and/or colour component Y is not highlighted separately. In any case, the disadvantage of using PR254 and PY151 alone in the provision of print designs for various substrates for use in the furniture and laminate flooring industry is an only insufficient colour shift towards orange-red as well as the comparatively high cost of these pigments. Thus, with the inks described in EP 2 865 528 B1, only insufficient coverage of the orange-red colour component is possible in digital printing. However, this colour space is important for providing warm tones for the furniture industry.

The use of a mixture or combination of red and yellow pigments for the colour components R and Y in the printing ink according to the solution, on the other hand, enables the desired shift in the colour space with an increase in the orange-red colour component. This colour space is adapted for warmer wood decors in analogue printing or gravure printing. It should be noted that analogue printing usually uses at least 5 primary colours, whereas digital printing is limited to 4 primary colours. Thus, with the present ink, it is possible to use this larger colour space in both analogue printing and digital printing without any changes that would lead to undesirable metamerism effects. White base coated wood-based panels on the one hand and white primed papers on the other hand can now be used as carrier materials. As long as the same décor is printed on both carrier materials using ink sets with the pigments mentioned, metamerism is largely avoided. At the same time, costs are reduced.

In one embodiment of the ink used herein, the colour component Y is a mixture of two yellow pigments or a mixture of a yellow pigment and a red pigment or a mixture of two yellow pigments and a red pigment.

PY150, 151, 154, 175, 180 or 194 can be used as yellow pigments, whereby PY150 and PY181 are preferred. PY181 and PY151 are benzimidazolone azo pigments, but PY181 has different substituents than PY151. For example, PY181 contains an amidobenzene side chain as R4 substituent, while PY151 has only a hydrogen at the same position. PY181 has good acid and base stability as well as solvent stability and is readily dispersible.

In a preferred embodiment, the colour component Y is a mixture of a first yellow base pigment and up to 30% by weight, preferably up to 20% by weight, of a second yellow pigment, in particular a mixture of PY 150 and 20% by weight of PY181 (% by weight are in each case based on the colour component Y).

In a further preferred embodiment, the colour component Y is a mixture of a first yellow base pigment and up to 10% by weight, preferably up to 5% by weight, of a red pigment, in particular from the group of quinacridone pigments, in particular a mixture of PY150 and 5% by weight of PR 207 (% by weight are in each case based on the colour component Y).

The red quinacridone pigment belongs to a group of organic pigments derived from the basic structure of quinacridone. They exhibit very good weather fastness, high colour strength and high chemical resistance. The red pigment used is preferably selected from the group containing 2,9-dimethylquinacridone (pigment red 122), 2,9-dichloroquinacridone (pigment red 202), mixed crystal of quinacridone and 4, 11-dichloroquinacridone (pigment red 207) and 3,10-dichloroquinacridone (pigment red 209). The red pigment PR207 as a solid solution of quinacridone and 4, 11-dichloroquinacridone is particularly preferred. A solid solution is to be understood as a solid solution which differs from a purely physical mixture of the individual components. In a solid solution, for example, the molecules of one component are incorporated into the crystal lattice of the other component. PR207 is described with a yellowish-red colour.

In a further preferred embodiment of the ink used herein, the colour component Y is a mixture of a first yellow base pigment, up to 20% by weight, preferably up to 15% by weight, of a second yellow pigment and up to 10% by weight, preferably up to 5% by weight, of a red pigment, in particular from the group of quinacridone pigments, in particular a mixture of PY150, 15% by weight PY181 and 5% by weight PR207 (% by weight are in each case based on the colour component Y).

In another embodiment of the ink used herein, the colour component R is a mixture of two red pigments or a mixture of one red pigment and one yellow pigment or a mixture of two red pigments and one yellow pigment.

Thus, in one variant, it can be provided that the colour component R is a mixture of a first red base pigment and up to 60% by weight, preferably up to 50% by weight, of a second red pigment, in particular from the group of quinacridone pigments, in particular a mixture of PR254 and 50% by weight of PR207 (% by weight are in each case based on the colour component R).

The red pigment PR254 belongs to the class of diketopyrrolopyrrole pigments and is described with a yellowish-red colour. PR254 is preferably used in automotive paints. However, other red pigments can also be used instead of PR254, such as PR266, 122, 202, 207.

In a further embodiment of the digital printing ink used here, the colour component R is a mixture of a mixture of a red pigment, in particular from the group of quinacridone pigments, and a yellow pigment, in particular a mixture of PR207 and PY181. The amount of PY181 is 5-15 wt %, preferably 6-10 wt % (wt % are in each case based on the colour component R).

In an even further embodiment of the digital printing ink used in the present case, the colour component R is a mixture of a first red base pigment, up to 60%, preferably up to 50% of a second red pigment, in particular from the group of quinacridone pigments, and a yellow pigment, in particular a mixture of PR254, 50% by weight PR207 and PY181. The amount of PR207 is about 50 wt % and the amount of PY181 is 3-10 wt %, preferably 3-5 wt % (wt % are in each case based on the colour component R).

The present CRYK digital printing ink may be used in the following combinations of colour component R and Y, wherein at least one cyan pigment is present as colour component C and at least one black carbon pigment is present as colour component K, respectively:

a) Colour component Y: Mixture of two yellow pigments; colour component R: one red pigment;

b) Colour component Y: Mixture of a yellow pigment and a red pigment, in particular from the group of quinacridone pigments; colour component R: a red pigment;

c) Colour component Y: Mixture of two yellow pigments and one red pigment, in particular from the group of quinacridone pigments; colour component R: one red pigment;

d) colour component Y: a yellow pigment; colour component R: mixture of two red pigments, one of the red pigments preferably being from the group of quinacridone pigments;

e) Colour component Y: Mixture of two yellow pigments; Colour component R: Mixture of two red pigments, wherein one of the red pigments is preferably from the group of quinacridone pigments;

f) Colour component Y: Mixture of a yellow pigment and a red pigment, in particular from the group of quinacridone pigments; colour component R: Mixture of two red pigments, one of the red pigments preferably being from the group of quinacridone pigments;
g) Colour component Y: Mixture of two yellow pigments and one red pigment, in particular from the group of quinacridone pigments; colour component R: Mixture of two red pigments, one of the red pigments preferably being from the group of quinacridone pigments;
h) colour component Y: a yellow pigment; colour component R: mixture of two red pigments, one of the red pigments preferably being from the group of quinacridone pigments, and a yellow pigment;
i) colour component Y: mixture of two yellow pigments; colour component R: mixture of two red pigments, one of the red pigments preferably being from the group of quinacridone pigments, and a yellow pigment;
j) Colour component Y: mixture of a yellow pigment and a red pigment, in particular from the group of quinacridone pigments; colour component R: mixture of two red pigments, one of the red pigments preferably being from the group of quinacridone pigments, and a yellow pigment.
k) Colour component Y: Mixture of two yellow pigments and one red pigment, in particular from the group of quinacridone pigments; colour component R: Mixture of two red pigments, one of the red pigments preferably being from the group of quinacridone pigments, and one yellow pigment.

Particularly preferred embodiments are listed in Table 1:

TABLE 1

| | Colour component Y | Colour component R | Colour component C | Colour component K |
|---|---|---|---|---|
| 1 | PY 150 PY181 | PR254 | PC | Carbon Black |
| 2 | PY 150 PR 207 | PR254 | PC | Carbon Black |
| 3 | PY 150 PY181 PR207 | PR254 | PC | Carbon Black |
| 4 | PY150 | PR254 PR207 | PC | Carbon Black |
| | PY150 | PR207 PY181 | PC | Carbon Black |
| | PY 150 PY181 | PR254 PR207 | PC | Carbon Black |
| | PY 150 PR 207 | PR254 PR207 | PC | Carbon Black |
| | PY150 PY181 | PR254 PY181 | PC | Carbon Black |
| | PY150 PY181 | PR207 PY181 | PC | Carbon Black |
| | PY150 PY181 | PR254 PY181 | PC | Carbon Black |
| | PY 150 PY181 PR207 | PR254 PR207 | PC | Carbon Black |
| | PY 150 PY181 PR207 | PR254 PY181 | PC | Carbon Black |
| | PY 150 PY181 PR207 | PR207 PY181 | PC | Carbon Black |
| | PY150 | PR254 PR207 PY181 | PC | Carbon Black |
| | PY 150 PY181 | PR254 PR207 PY181 | PC | Carbon Black |
| | PY 150 | PR254 | PC | Carbon Black |

TABLE 1-continued

| Colour component Y | Colour component R | Colour component C | Colour component K |
|---|---|---|---|
| | PR 207 PY181 | | |
| PY 150 PY181 PR207 | PR254 PR207 PY181 | PC | Carbon Black |

Further particularly preferred embodiments are listed in Table 2:

| | Colour component Y | Colour component R | Colour component C | Colour component K |
|---|---|---|---|---|
| 1 | PY 150 PY181 20% | PR254 | PC 15:3 | Carbon Black |
| 2 | PY 150 PR 207 5% | PR254 | PC 15:3 | Carbon Black |
| 3 | PY 150 PY181 15% PR207 5% | PR254 | PC 15:3 | Carbon Black |
| 4 | PY150 | PR254 PR207 50% | PC 15:3 | Carbon Black |
| | PY 150 PY181 20% | PR254 PR207 50% | PC 15:3 | Carbon Black |
| | PY 150 PR 207 5% | PR254 PR207 50% | PC 15:3 | Carbon Black |
| | PY 150 PY181 15% PR207 5% | PR254 PR207 50% | PC 15:3 | Carbon Black |
| | PY150 | PR254 PR207 50% PY181 approx. 3-5% | PC 15:3 | Carbon Black |
| | PY 150 PY181 20% | PR254 PR207 50% PY181 approx. 3-5% | PC 15:3 | Carbon Black |
| | PY 150 PR 207 5% | PR254 PR207 50% PY181 approx. 3-5% | PC 15:3 | Carbon Black |
| | PY 150 PY181 15% PR207 5% | PR254 PR207 50% PY181 approx. 3-5% | PC 15:3 | Carbon Black |
| | PY150 | PR 254 PY181 approx. 6-10% | PC 15:3 | Carbon Black |
| | PY150 | PR 207 PY181 approx. 6-10% | PC 15:3 | Carbon Black |
| | PY 150 PY181 20% | PR 254 PY181 approx. 6-10% | PC 15:3 | Carbon Black |
| | PY 150 PY181 20% | PR 207 PY181 approx. 6-10% | PC 15:3 | Carbon Black |
| | PY 150 PY181 15% PR207 5% | PR 254 PY181 approx. 6-10% | PC 15:3 | Carbon Black |
| | PY 150 PY181 15% PR207 5% | PR 207 PY181 approx. 6-10% | PC 15:3 | Carbon Black |
| | PY 150 PY181 15% PR207 5% | PR254 PR 207 50% PY181 approx. 3-5% | PC 15:3 | Carbon Black |

It should be noted that the different colour pigments for colour component R and colour component Y are respectively combined or mixed before application.

In one embodiment of the ink used in the present method, the at least one cyan pigment is a copper phthalocyanine pigment, preferably C.I. Pigment Blue (PB) 15:3 or C.I. Pigment Blue 15:4, more preferably C.I. Pigment Blue 15:3.

In another embodiment of the ink used in the present process, the black carbon pigment is a carbon black pigment, in particular selected from the group consisting of Regal™ 400R, Mogul™ L, Elftex™ 320 from Cabot Co, or Carbon Black FW18, Special Black™ 250, Special Black™ 350, Special Black™ 550, Printex™ 25, Printex™ 35, Printex™ 55, Printex™ 90, Printex™ 150T from DEGUSSA Co., MA8 from MITSUBISHI CHEMICAL Co., and C.I. Pigment Black (PBL) 7 and C.I. Pigment Black 11.

The total pigment concentration in the ink used in the present case is more than 8% by weight, preferably between 6 and 15% by weight, in particular preferably between 4 and 10% by weight, based on the total weight of the ink. The total pigment concentration does not change significantly during mixing—only the proportion of the individual pigments is changed during mixing.

As already mentioned, the ink used in the present case is an aqueous ink. The water content in the ink is at least 50%, preferably above 50%, particularly preferably at least 55%, e.g. 51%, 52% or 53%.

The ink used in the present case also has a solvent content. Thus, the ink contains at least one organic solvent with a proportion of less than 45%, preferably less than 43%; e.g. 41%, 42%.

The organic solvent keeps the ink in a processable consistency, especially in combination with further additives such as dispersing aids. Glycol or other alcohols such as ethanol can be used as organic solvents.

In addition, the ink used in the present case may contain further additives such as biocides, humectants, acid/bases for adjusting the pH value, surfactants as surface-active substances. The humectants may include 2-pyrrolidone, glycerol and 1,2-hexanediol in an amount between 0.1 and 25% by weight, based on the total weight of the aqueous inkjet ink.

As mentioned above, various carrier materials can be printed with the present process.

Thus, in one embodiment, the at least one carrier material to be printed is at least one raw paper. In this context, raw papers are understood to be papers that have neither been subjected to gluing in the mass nor impregnation of the surface with a resin or glue. Raw papers essentially consist of pulps, pigments and fillers and the usual additives. For the production of raw papers such as decor papers, softwood pulps, hardwood pulps or mixtures of both types of pulp can be used. Inorganic colour pigments such as metal oxides, metal hydroxides and metal oxide hydrates, metal sulphides, metal sulphates, metal chromates and metal molybdates as well as organic colour pigments and/or dyes such as carbonyl colourants, cyanine colourants and others can be used to colour the raw papers.

In a preferred embodiment, the raw paper to be printed is at least one paper web without impregnation with at least one ink-receiving layer. The ink-receiving layer is preferably a hydrophilic coating containing water-soluble or water-dispersible polymers or binders and inorganic pigments.

For example, polyvinyl alcohol, polyvinyl pyrrolidone, polyvinyl acetate, starch, gelatin, carboxymethyl cellulose, ethylene/vinyl acetate, styrene/acrylic acid ester copolymers or mixtures thereof may be used as binders.

Inorganic white pigments such as silicates, kaolin, calcium carbonate, aluminium hydroxide, talc, titanium dioxide or colour pigments such as iron oxide, carbon black or organic colour pigments can be contained as inorganic pigments in the ink-receiving layer. The ratio of pigment to binder in the ink-receptive layer is between 1:0.05-1:1 based on the solids content.

In a preferred embodiment, the ink-receiving layer contains silicates, aluminium oxides, aluminium hydroxides or aluminium silicates and polyvinyl alcohol as a water-soluble polymeric binder.

The basis weight of the ink-receptive layer can be between 0.5-20 g/m$^2$.

In a further embodiment, the at least one carrier material to be printed is at least one pre-treated, impregnated paper. By a pre-treated paper (or cellulose layer) is meant a paper or paper web impregnated with a resin solution. The paper can be impregnated with a wide variety of resin solutions, for example melamine resins and urea resins, plastic-acrylate compounds or starch-glue. It is also possible to impregnate the paper using resin powder. The use of resin powder is described in detail below.

In a preferred embodiment, an impregnated paper is used which is prepared by the following process steps (see also EP 2 980 313 A1): a) complete impregnation of the cellulose layer with a curable resin (e.g. melamine-formaldehyde resin), b) removing the excess resin that forms on the surface (e.g. by peeling or stripping off), c) drying the impregnated cellulose layer in such a way that, after evaporation of the water from the resin, the cellulose fibres on the surface from which the resin has been removed are at least partially exposed.

Peeling or stripping causes the resin remaining on the surface of the cellulose layer to seal with the fibre tips. In the drying process, the resin retracts into the fibres so that the fibres are impregnated with the resin but not enclosed by it. Such a surface is suitable for printing with aqueous digital inks.

The special equipment used for peeling or stripping works similar to a spatula machine where one or more rollers run backwards on the paper and pick up the excess resin. By varying the speed of the rollers, the amount can be precisely controlled and repeatability ensured.

To improve the printing result, the treated paper (raw paper without or with ink-receptive layer, impregnated paper) can additionally be provided with a primer material.

The primer material can be a water-based synthetic resin or acrylic resin dispersion that is completely miscible with water or partially soluble in water. The primer material should have a low solvent content of less than 3%.

As indicated above, the print decoration is applied to the carrier material in direct printing by means of a digital printing process using the CRYK ink described above. In digital printing, the printed image is transferred directly from a computer to a printing machine, such as an inkjet printer. The decor data is translated into machine data by software (e.g. RIP software from the manufacturer Colorgate).

The printed papers (raw paper or impregnated paper) can be provided with a resin layer as a protective layer after printing. This protective layer can consist of a not yet fully cured resin, preferably a formaldehyde-containing resin, in particular preferably melamine-formaldehyde resin, urea-formaldehyde resin and/or melamine-urea-formaldehyde resin, or a radiation-curable acrylate, preferably polyester acrylates, polyether acrylates, urethane acrylate, hexanediol diacrylate or mixtures thereof. This protective layer serves to protect the printing decorations and enables intermediate storage.

As mentioned, the applied protective layer should not yet be fully cured, which is controlled in particular by the drying process.

In particular, all impregnated papers must have a residual moisture content, regardless of the intended use. This enables the creation of qualitatively flawless products regardless of the type of further processing (short-cycle, Conti or multi-daylight press). The residual moisture is an indication of the degree of cross-linking of the synthetic resins used.

The resins used for impregnating paper layers (or also for direct coating of other carrier plates, see below) pass through various polymerization and cross-linking states in these processes.

This is illustrated below using the example of melamine-formaldehyde resin, which is frequently used in the manufacture of wood-based panels.

Melamine and formaldehyde first react to form methylol groups on the amino groups of melamine to form water-soluble products (see Scheme I).

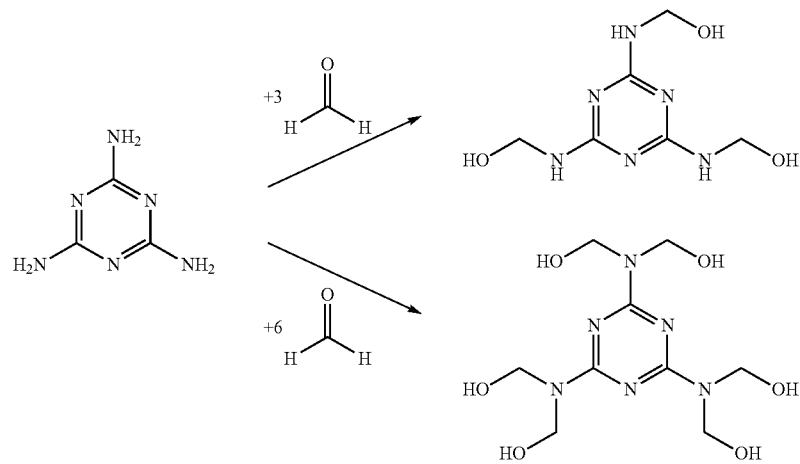

Scheme I

These melamine-formaldehyde monomers undergo polycondensation after the addition of a suitable catalyst, preferably an acid, resulting in the linking of the monomers via ether and methylene groups and the formation of higher molecular weight precondensates and polycondensates (see Scheme II).

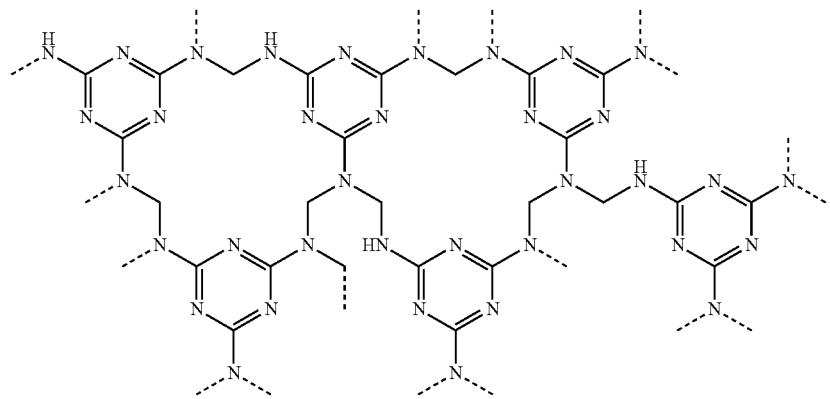

Scheme III

Precondensates and polycondensates differ in terms of their molar mass and solubility. Thus, the low-molecular-weight precondensates can still have limited solubility in water, while the higher-molecular-weight polycondensates are insoluble. The limited water solubility of the precondensates is caused, among other things, by still free methylol groups and the low degree of cross-linking of the mostly still linear oligomers. The precondensates are thus a polymerisation intermediate.

When the polycondensates are completely hardened, strong cross-linking occurs with the splitting off of the methylol groups still present, whereby closely meshed cross-linked plastics are formed via methylene groups (see Scheme III).

Scheme III

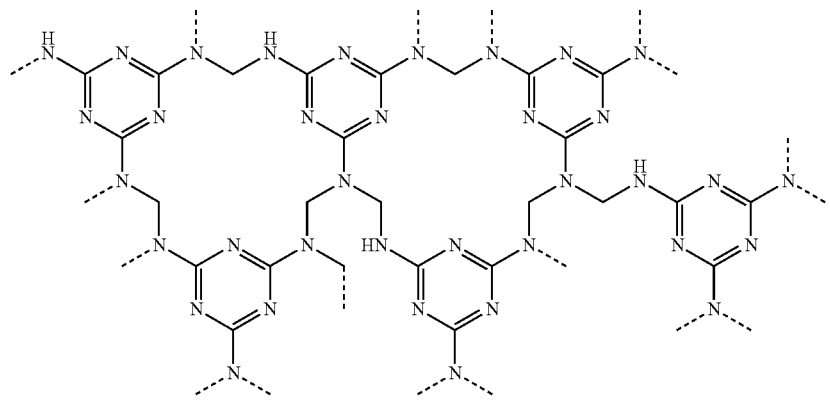

For synthetic resins curing via condensation reactions, a distinction is therefore made between the following resin states:
- A-state: easily soluble in solvents, meltable, curable;
- B-state: only partially soluble in solvent, meltable, hardenable;
- C-State: insoluble, cured In the case of using impregnated paper layers for finishing wood-based panels, e.g. for high-quality flooring panels, it is desirable that the impregnating resin is not yet fully cured, but is preferably still in the partially cross-linked B-state. During further processing in the press, this still enables flowing/filming in combination with further cross-linking of the synthetic resins. Accordingly, the present impregnated and printed papers are preferably dried to the B state.

The printed and, if necessary, coated or impregnated paper can then be pressed with a material board, at least one protective paper (overlay) and, if necessary, a backing paper.

In a further embodiment, the at least one carrier material to be printed is at least one material board, in particular a wood material board, such as MDF and HDF boards made of wood fibres, particle boards made of chips, OSB made of wood strands, wherein the wood fibres, wood chips and wood strands are each mixed with suitable adhesives and hot pressed), WPC boards, plastic board, e.g. SPC (stone plastic composite) or a cement fibre board. Suitable for direct printing are e.g. carrier materials such as wood materials, wood material-plastic mixtures, WPC, plastics or mixtures of different plastics, for example PE, PP, PVC, PU, all also with fillers such as chalk, talc or also fibres.

In one embodiment, the surface of the material board can be pre-treated before printing to improve the adhesion of the subsequent layers. This can be a cleaning with brushes, a sanding, which also frees the surface from unevenness, and/or a plasma or corona treatment.

In one embodiment, an unsanded wood-based panel, in particular MDF or HDF, can also be used, which is still provided with a pressed skin (rotting layer) on the upper side. Water-based melamine resin is applied to the top side to fill the press skin. The melamine resin is later melted in the short-cycle press and thus has a tempering effect in the area of this layer; i.e. it counteracts delamination.

In a preferred embodiment, at least one base coat is applied in a next step to increase the opacity.

The base coat preferably comprises casein, corn starch or soy protein and may contain inorganic colour pigments and thus serve as a base coat layer for the decorative layer to be subsequently printed on.

White pigments such as titanium dioxide $TiO_2$ can be used as colour pigments. Other colour pigments can be calcium carbonate, barium sulphate or barium carbonate, but also iron oxide pigments (for a brownish primer). In addition to the colour pigments and the casein, corn starch or soy protein, the primer can also contain water as a solvent.

The amount of liquid base coat applied may be between 10 and 50 $g/m^2$, preferably between 15 and 30 $g/m^2$, more preferably between 20 and 25 $g/m^2$.

It is also conceivable that the base coat consists of at least one, preferably at least two or more successively applied layers or applications (e.g. up to five applications), wherein the application quantity between the layers or applications is the same or different, i.e. the application quantity of each individual layer may vary.

The base coat can be applied to the material carrier board using a roller with subsequent drying. It is also possible to apply the base coat to the material board using digital printing. In this case, water-based inks enriched with white colour pigments are preferably used, which are suitable for the digital printing inks used below. Application by means of digital printing is advantageous because the printing equipment is significantly shorter than a rolling device and thus saves space, energy and costs.

In a further embodiment of the present method, a primer layer is applied to the base coat, preferably as a single application with subsequent drying. The amount of liquid primer applied is between 10 and 30 $g/m^2$, preferably between 15 and 20 g/m². Polyurethane-based compounds are preferably used as primers.

Following the printing of the base coated material board in digital printing using the CRYK ink described above, the decorative layer can also be provided with a protective layer (as already described above for the papers).

This protective layer can be a formaldehyde-containing resin (in the B-state, see above), in particular a melamine-formaldehyde resin, urea-formaldehyde resin or melamine-urea-formaldehyde resin and contain glass beads (size 50-150 µm) as spacers for optional intermediate storage of the panels. This protective layer serves as a temporary protection of the decorative layer for storage before further finishing. The protective layer on the decorative layer is not yet fully cured, but has a certain residual moisture of about 10%, preferably about 6%, and can still be further cross-linked. In case of intermediate storage, the resin thus remains in state B (not yet fully cured and cross-linked), whereby the decor is protected. The glass beads can be added to the resin or sprinkled on top and act as spacers. Such protective layers are described, for example, in WO 2010/112125 A1 or EP 2 774 770 B1.

Alternatively, go directly to the next process step.

In a more advanced embodiment, at least one wear protection layer is applied to the printed material board (with or without a protective layer).

This wear protection layer can consist of one or more layers, e.g. three, four, five or six layers.

In one embodiment, an anti-wear layer is applied using the following steps:
  applying at least one first resin layer to the at least one decorative layer on the upper surface of the material board, the first resin layer having a solids content of between 60 and 80% by weight, preferably between 65 and 70% by weight, more preferably between 65 and 67% by weight;
  uniform scattering of abrasion-resistant particles onto the first resin layer on the top of the material board;
  wherein the first resin layer provided with the abrasion-resistant particles on the upper side of the material board is not dried after application, if applicable,
  applying at least one second resin layer to the first, optionally moist, resin layer provided with the abrasion-resistant particles on the upper side of the material board, the second resin layer having a solids content of between 60 and 80% by weight, preferably between 65 and 70% by weight, more preferably between 65 and 67% by weight;
  subsequent drying of the assembly of first resin layer and second resin layer in at least one drying device;
  applying at least a third resin layer, wherein the third resin layer has a solids content between 60 and 80 wt %, preferably 65 and 70 wt %, more preferably between 65 and 67 wt %, and contains glass beads;
  subsequent drying of the applied third resin layer in at least one further drying device;
  applying at least a fourth resin layer, wherein the fourth resin layer has a solids content between 50 and 70 wt %, preferably 55 and 65 wt %, more preferably between 58 and 62 wt %, and contains glass beads;
  subsequent drying of the applied fourth resin layer in at least one further drying device;
  applying at least a fifth resin layer, the fifth resin layer having a solids content of between 50 and 70% by weight, preferably 55 and 65% by weight, more preferably between 58 and 62% by weight, and containing glass beads;
  subsequent drying of the applied fifth resin layer in at least one further drying device;
  applying at least a sixth resin layer, wherein the sixth resin layer has a solids content between 50 and 70 wt %, preferably 55 and 65 wt %, more preferably between 58 and 62 wt % and does not contain glass beads;
  subsequently drying the applied sixth resin layer in at least one further drying apparatus; and
  Pressing of the layer structure in a short-cycle press.

The resin layers used for the wear protection layer are preferably based on aqueous formaldehyde-containing resins, in particular melamine-formaldehyde resin, urea-formaldehyde resin or melamine-urea-formaldehyde resin.

The resins used preferably each contain additives such as hardeners, wetting agents (surfactants or mixtures thereof), defoamers, release agents and/or other components. The wetting agent is used in the resin layers in an amount of 0.1-1 wt % in each case. Release agents and smoothing agents are preferably added to the fifth and sixth resin layer in amounts between 0.5-1.5 wt %.

The preferred hardener is a latent hardener, such as alkanolamine salts of acids, e.g. an alkanolamine salt of a sulfonic acid (see DeuroCure from the manufacturer Deurowood). The latent hardener is preferably added to the resin immediately before the application unit in order to avoid premature curing of the resin and thus losses. Accordingly, the hardener is preferably not added centrally, but the variable hardener quantity is only added at the corresponding application units. This has the advantage that, in the event of a malfunction, the resin can remain in the pipes longer without the hardener. Only the application units with resin hardener have to be specifically adjusted to the pot life of the system. This significantly reduces losses due to the need to pump out resin-hardener in the event of a standstill or malfunction.

The proportion of hardener in the individual resin layers varies and can be between 0.5 to 1.5 wt %, preferably 0.7 to 1.3 wt %. It is particularly preferred that the proportion of hardener per resin layer decreases in the direction of production; i.e. in the lower resin layers the proportion of hardener is greater than in the upper resin layers. By reducing the amount of hardener from the lower to the upper resin layers, a uniform curing of the individual resin layers in the KT press can be realized.

In one variant of the process, the first resin layer is applied in an amount between 10-100 g/m², preferably 40-80 g/m², more preferably 45-60 g/m². The first resin layer is applied, for example, with a grooved applicator roller in a first applicator unit.

The first resin layer may contain cellulose fibres or wood fibres, preferably cellulose fibres. By adding cellulose fibres, the viscosity of the resin to be applied can be adjusted and the application of the first top layer to the wood-based panel can be increased. The amount of cellulose fibres applied with the first resin layer can be between 0.1 and 1 wt %, preferably between 0.5 and 0.8 wt % (based on the amount of resin to be applied) or between 0.1-0.5 g/m², preferably 0.2-0.4 g/m², more preferably 0.25 g/m². The cellulose fibres preferably used have a white colour and are in the form of a fine or granular, slightly hygroscopic powder.

In a further embodiment of the present method, particles of corundum (aluminium oxides), boron carbides, silicon dioxides, silicon carbides are used as abrasion-resistant particles. Particularly preferred are corundum particles. Preferably, these are noble corundum (white) with a high transparency, so that the optical effect of the underlying decoration is adversely affected as little as possible. Corundum has an irregular spatial shape.

The amount of scattered abrasion-resistant particles is 10 to 50 g/m$^2$, preferably 10 to 30 g/m$^2$, more preferably 15 to 25 g/m$^2$. The amount of scattered abrasion-resistant particles depends on the abrasion class to be achieved and the particle size. Thus, in the case of abrasion class AC3, the amount of abrasion-resistant particles is in the range between 10 to 15 g/m$^2$, in abrasion class AC4 between 15 to 20 g/m$^2$ and in abrasion class AC5 between 20 to 25 g/m$^2$ when using grit size F200. In the present case, the finished panels preferably have abrasion class AC4.

Abrasion-resistant particles with grain sizes in classes F180 to F240, preferably F200, are used. The grain size of class F180 covers a range of 53-90 µm, F220 from 45-75 µm, F230 34-82 µm, F240 28-70 µm (FEPA standard). In one embodiment, noble corundum white F180 to F240, preferably in a main grain size range of 53-90 µm, are used as abrasion resistant particles. In a particularly preferred embodiment, corundum particles of class F200 are used, where F200 is a mixture between F180 and F220 and has a diameter between 53 and 75 µm.

The abrasion-resistant particles must not be too fine-grained (risk of dust formation), but also not too coarse-grained. The size of the abrasion-resistant particles is thus a compromise.

In a more advanced embodiment, salinized corundum particles may be used. Typical salinization agents are aminosilanes.

In another embodiment of the present method, the second resin layer to be applied to the upper surface of the material board is applied in an amount between 10-50 g/m$^2$, preferably 20-30 g/m$^2$, more preferably 20-25 g/m$^2$. Overall, the amount of the second resin layer is less than the amount of the first resin layer. In a preferred embodiment, the second resin layer to be applied to the upper surface of the material board does not contain any glass beads.

The total amount of first and second resin layer is between 50-100 g/m$^2$, preferably 60-80 g/m$^2$, more preferably 70 g/m$^2$. Thus, in one variant, the amount of the first resin layer is 50 g/m$^2$ and the amount of the second resin layer is 25 g/m$^2$.

The abrasion-resistant particles are enriched in the second resin layer by entrainment of loose particles by the second applicator. Thus, a content of abrasion-resistant particles of 5 to 15 wt. %, preferably 10 wt. %, can occur in the resin to be applied as a second resin layer.

As explained above, further layers of resin, a third, fourth, fifth and sixth resin layer, are subsequently applied to the second resin layer and each is dried after application.

The amount of the third resin layer applied to the top surface of the wood-based panel may be between 10-50 g/m$^2$, preferably 20-30 g/m$^2$, more preferably 25 g/m$^2$.

As explained above, the third resin layer contains glass beads that act as spacers. The preferred glass beads have a diameter of 90-150 µm. The glass beads can be applied together with the third resin layer or sprinkled separately on the third resin layer. The amount of glass beads is 10 to 50 g/m$^2$, preferably 10 to 30 g/m$^2$, more preferably 15 to 25 g/m$^2$. The batch preferably consists of approx. 40 kg resin liquid plus glass beads and auxiliary materials. The glass beads can also be in salinized form. Salinization of the glass beads improves the embedding of the glass beads in the resin matrix.

The amount of the fourth resin layer (which also contains glass beads) applied to the top surface of the wood-based panel may be between 10-40 g/m$^2$, preferably 15-30 g/m$^2$, more preferably 20 g/m$^2$.

As explained above, the solids content of the fourth resin layer (as well as the fifth and sixth resin layers) is lower compared to the first to third resin layers. The varying solids content of the resin layers to be applied allows, on the one hand, a higher total layer thickness due to the increased solids content in the first to third layer, and on the other hand, the reduced solids content in the fourth to sixth resin layer ensures that the drying and pressing time is sufficient for the total build-up.

The amount of the fifth resin layer applied to the upper side of the wood-based panel can be between 10-40 g/m$^2$, preferably 15-30 g/m$^2$. As stated above, the fifth resin layer also contains glass beads. The glass beads can be applied together with the third resin layer or sprinkled separately on top of the third resin layer. The glass beads are applied in a quantity of 8 to 10 kg per application.

The sixth resin layer to be applied to the fifth resin layer after drying, on the other hand, does not contain any glass beads. The omission of glass beads in the sixth resin layer ensures that the underlying resin layers, which have already dried, are not destroyed and that the surface of the resin structure does not appear torn.

The total layer thickness of the applied resin layers on the wood-based panel can be between 60 and 200 µm, preferably between 90 and 150 µm, more preferably between 100 and 120 µm. The total layer thickness is thus significantly higher than previous processes, which typically achieve layer thicknesses of up to 50 µm.

In a further embodiment, one resin layer is applied to the lower side of the material board at a time together with the second, third, fourth, fifth and sixth resin layers to be applied to the upper side of the material board.

Thus, in one embodiment, a resin layer is also applied to the lower side of the material board parallel to the second resin layer on the upper side of the material board. The amount of resin layer applied to the lower side of the material board may be between 50-100 g/m$^2$, preferably 60-80 g/m$^2$, more preferably 60 g/m$^2$. Preferably, the lower resin layer is coloured (e.g. brownish) to simulate a counter-backing. The second resin layer is preferably applied in parallel or simultaneously to the upper side and lower side of the material board in at least one double application device (roller application unit). After application of the second resin layer, drying (air drying) of the assembly of first and second resin layer takes place in a first drying device.

In the same way, a third, fourth, fifth and sixth resin layer are applied to the lower side parallel to the upper side in double application units on the carrier board and dried in each case following the application.

The resin layer(s) applied to the lower side act as a counter-backing. Applying the resin layers to the top and bottom of the material boards in approximately equal amounts ensures that the tensile forces on the material board caused by the applied layers cancel each other out during pressing. The layer structure and thickness of the counter backing applied to the lower side corresponds approximately to the layer sequence applied to the upper side, but without the addition of glass beads.

The drying of the resin layers takes place at dryer temperatures between 150 and 220° C., preferably between 180 and 210° C., in particular in a convection dryer. The temperature is adapted to the respective resin layers and can vary in the individual convection dryers; for example, the temperature in the second, third and fourth convection dryers can be 205° C. and in the fifth and sixth convection dryers each can be 198° C. However, other dryers can be used instead of convection dryers.

In the pressing step following the last drying step, the layer structure is pressed under the influence of pressure and temperature in a short-cycle press at temperatures between 150 and 250° C., preferably between 180 and 230° C., more preferably at 200° C., and at a pressure between 30 and 60 kg/cm², more preferably between 40 and 50 kg/cm². The pressing time is between 5 to 15 sec, preferably between 7 to 10 sec. In comparison: for decor papers, a pressure of 50-60 kg/cm² is applied for 16 sec.

Preferably, the coated material board is aligned in the short-cycle press with a structured press plate located in the short-cycle press by means of markings on the wood-based material board, so that congruence is produced between the decor on the wood-based material board and the structure of the press plate to be imprinted. This enables the production of a decor-synchronous structure. During pressing, the melamine resin layers melt and form a laminate through a condensation reaction involving the corundum/glass/fibre components.

In another embodiment, the material board is processed with the following process steps:
a) applying at least one first layer of at least one powdered resin to at least one side of a wood-based board and melting-on the at least one applied layer of powdered resin;
a1) optional application of at least one base coat layer which may contain colour pigments, in particular white colour pigments;
a2) optional application of at least one primer layer;
b) applying at least one printed decoration or decorative layer by means of digital printing using the CRYK ink described above; and
c) applying at least one further (second) layer of at least one powdered resin to the at least one printed decorative layer and melting-on the at least one layer of powdered resin spread on the decorative layer.

In one embodiment of the present method, the powdered resin is applied to the wood-based panel in an amount of 10 to 50 g/m², preferably 15 to 30 g/m², more preferably 20 to 25 g/m². This application quantity of resin powder applies essentially to all layers of resin powder to be applied, although these can be adjusted in each case. The spreading density is selected in such a way that covering layers are produced in each case.

The particle size of the powdered resin is between 20 to 100 μm, preferably between 40 and 89 μm.

In a further embodiment of the present method, the powdered resin to be applied is a formaldehyde resin, preferably a urea resin, a melamine resin or a phenolic resin, more preferably a melamine-formaldehyde resin. It is preferred if a melamine resin or a urea resin is used for the first resin layer. Preferably, only melamine resin is used in the upper layers.

"Melting-on" or "gelation" in the sense of the present application means that the resin layer is not yet completely polymerized, but rather the polymerization is stopped at an intermediate stage in which further cross-linking or polymerization is still possible at a later processing time. The purpose of "gelling" is therefore usually to apply further functional layers to the already applied protective layer at a later time or to finish the product in further processing steps.

Other substances can also be added to the melamine resin powder. It is particularly advantageous that substances that are poorly compatible with liquid melamine resin, e.g. due to salting-out, thickening, settling, curing effects, etc., can also be used. These can be salts to increase conductivity, organic or inorganic flame retardants, cellulose derivatives, radical scavengers, pigments, UV absorbers, etc.

Accordingly, the powdered resin used may contain additives such as pigments, conductive substances and cellulose.

If colour pigments are added, the layer of melted-on resin powder can simultaneously serve as a white base coat layer for the decorative layer to be printed on afterwards. White pigments such as titanium dioxide $TiO_2$ can be used as colour pigments. Other colour pigments can be calcium carbonate, barium sulphate or barium carbonate. The proportion of colour pigments can be up to 50% by weight of the total amount of powder.

The addition of colour pigments to the first layer of resin powder increases the opacity so that it can be used as a (sole) base or base coat for the subsequent decorative layer.

In a preferred embodiment, the resin powder is applied by means of electrostatic charging. The application can also be carried out by means of powder coating according to the tribo method. In this case, the powder to be applied is frictionally charged.

The melting-on of the applied layer of powdered resin can be done using an IR radiator, or microwave systems or similar. The use of IR emitters is particularly preferred.

The further powder resin layer applied and melted-on in step c) of the present method preferably comprises formaldehyde resin-based powder, particularly preferably melamine-formaldehyde resin. The amount of resin powder applied in this step is between 10 and 50 g/m², preferably between 20 and 40 g/m².

In a more advanced embodiment, abrasion-resistant particles are evenly sprinkled on the decorative layer or the resin powder layer applied in step c) (step d).

In a more advanced embodiment of the present method, at least a third layer of at least one powdered resin (step e) is applied, in particular to the layer of abrasion-resistant particles. This layer serves as a separation layer for blocking off the abrasion-resistant particles.

The powder resin layer applied and melted-on in this step e) preferably comprises formaldehyde resin-based powder, particularly preferably melamine-formaldehyde resin. The amount of resin powder applied in this step is between 10 and 50 g/m², preferably between 20 and 40 g/m².

In a further embodiment of the present method, glass beads are sprinkled, in particular on the at least one third molten-on resin powder layer (step f). The glass beads act as spacers between abrasion-resistant particles and subsequent pressed sheet metal. In this way, wear of press plates can be at least partially reduced.

In a further embodiment of the present method, at least a fourth layer of at least one powdered resin is applied, in particular to the layer of glass beads (step g). This layer serves to seal off the glass beads and as a finishing layer.

The fourth powder resin layer applied and melted-on in this step g) preferably comprises formaldehyde resin-based powder, particularly preferably melamine-formaldehyde resin. The amount of resin powder applied in this step is between 10 and 50 g/m², preferably between 20 and 40 g/m².

In a further embodiment of the present method, the layered structure is pressed in a short-cycle press (KT press) (step h). The pressing step takes place under the influence of pressure and temperature at temperatures between 180 and 250° C., preferably between 200 and 230° C., more preferably at 200° C. and a pressure between 30 and 60 kg/cm², more preferably between 40 and 50 kg/cm². The pressing time is between 8 and 30 sec, preferably between 10 and 25 sec.

The proposed solution is explained in more detail below with reference to examples of embodiments.

EXAMPLE 1A: PRINTING ON RAW PAPER

A raw paper (paper weight: 80 g/m²) is unrolled from an unwinding device.

A decorative layer is applied by digital printing using a CRYK ink with the following composition;

| | Pigment | Total pigment content | Solvent | Water |
|---|---|---|---|---|
| C | PC 15:3 | Max. 2% | 42% | 56% |
| R | PY254 48% PR207 48% PY181 4% | Max. 7% | 30% | 63% |
| Y | PY 150 | Max. 4% | 37% | 59% |
| K | PBL 7 | Max. 4% | 36% | 60% |

Glycol is the preferred solvent.

The printing inks are applied in a quantity between 5 and 10 g/m².

The printed paper can be provided with a melamine-formaldehyde resin layer as a protective layer after printing. This protective layer serves to protect the printed decorations and enables intermediate storage.

The paper is then dried in a convection dryer or by NIR (near infrared) to a moisture content of approx. 6 wt % so that the resin layer is in the B state.

EXAMPLE 1B: PRINTING ON RAW PAPER WITH INK-RECEIVING LAYER

A raw paper (paper weight: 80 g/m²) is unrolled from an unwinding device. Then a pigmented ($TiO_2$) ink-receptive layer (synthetic silicate with polyvinyl alcohol as binder) (layer thickness 40 μm; after drying at 125° C. dry basis weight 4 g/m²) and a primer layer are applied and the layer structure is dried.

After drying, a decorative layer is applied to the paper thus obtained (paper weight: 80 g/m²) by digital printing using a CRYK ink with the above composition. The inks are applied in an amount between 5 and 10 g/m².

The printed paper can be provided with a melamine-formaldehyde resin layer as a protective layer after printing. This protective layer serves to protect the printed decorations and allows for intermediate storage.

The paper is then dried in a convection dryer or by NIR (near infrared) to a moisture content of approx. 6 wt % so that the resin layer is in the B state.

EXAMPLE 2A: PRINTING OF A FIRST IMPREGNATE WITH INK-RECEIVING LAYER

The paper to be printed is impregnated on the front and back with a liquid melamine resin in an impregnation device. Approx. 50 g melamine resin/m² with a solids content of approx. 50% is applied.

Subsequently, a pigmented ($TiO_2$) ink receptive layer (synthetic silicate with polyvinyl alcohol as binder) (layer thickness 40 μm; after drying at 125° C. dry basis weight 4 g/m²) and a primer layer are applied and the layer structure is dried.

After drying, a decorative layer is applied to the resulting impregnate (paper weight: 80 g/m²) by digital printing using a CRYK ink with the above composition. The inks are applied in an amount between 5 and 10 g/m².

The printed paper can be coated with a melamine-formaldehyde resin layer as a protective layer after printing.

The paper is then dried in a convection dryer or by NIR (near infrared) to a moisture content of approx. 6 wt % so that the resin layer is in the B state.

EXAMPLE 2B: PRINTING OF A SECOND IMPREGNATE WITH INK-RECEIVING LAYER

The paper to be printed is coated with melamine resin powder in an application device in a quantity of 25 g/m² using tribo guns. The melamine resin powder contained the usual additives such as hardeners, release agents, etc. The powder is then melted-on by infrared radiation.

Subsequently, a pigmented ($TiO_2$) ink receptive layer (synthetic silicate with polyvinyl alcohol as binder) (layer thickness 40 μm; after drying at 125° C. dry basis weight 4 g/m²) and a primer layer are applied and the layer structure is dried.

After drying, a decorative layer is applied to the resulting impregnate (paper weight: 80 g/m²) by digital printing using a CRYK ink with the above composition. The inks are applied in an amount between 5 and 10 g/m².

The printed paper can be coated with a melamine-formaldehyde resin layer as a protective layer after printing.

The paper is then dried in a convection dryer or by NIR (near infrared) to a moisture content of approx. 6 wt % so that the resin layer is in the B state.

EXAMPLE 2C: PRINTING A THIRD IMPREGNATE

The paper to be printed is impregnated on the front and back with a melamine resin in an impregnation device. Approx. 50 g melamine resin/m² with a solids content of approx. 50% is applied.

Before the dryer, the resin on the side of the impregnate to be printed is removed with a special device (e.g. a knife doctor blade) so that fibres remain free to receive the printer's ink.

After drying, a decorative layer is applied to the resulting impregnate (paper weight: 80 g/m²) by digital printing using a CRYK ink with the above composition. The inks are applied in an amount between 5 and 10 g/m².

Further drying of the printed impregnate is not necessary as the digital printing ink introduces only little moisture.

EXAMPLE 3: PRINTING A BOARD WITH LIQUID OVERLAY

An HDF board (fibreboard with increased bulk density) is first pre-coated with an aqueous synthetic resin (melamine-formaldehyde resin). The application quantity is 20-50 g resin liquid/m² (solids content: approx. 55%). The resin contains the usual additives such as wetting agents, hardeners, release agents and defoamers. Afterwards, the applied resin is dried in a convection dryer or a near-infrared oven to a humidity of approx. 20%. Then several coats of a water-based, pigmented base coat are applied (5-8 x). After each application, the base coat is dried using a convection dryer or a near-infrared dryer.

In the following, the base coated panel is printed with a motif using a digital printer. Approx. 6-8 g/m² of the water-based CRYK digital printing ink is used.

After the decorative layer has dried, approx. 70 g of melamine resin fl. (solids content: 55% by weight) containing the usual additives (hardener, wetting agent, etc.) is applied to the printed panel surface in a first roller application unit. A melamine resin is also applied to the underside of the board with the first roller application unit (application quantity: 60 g resin fl./m², solids content: approx. 55% by weight).

Afterwards, 14 g corundum/m² (F 200) are sprinkled on the surface with a sprinkling apparatus. A distance of approx. 5 m to the dryer allows the corundum to sink into the melamine resin. The board then passes through a circulating air dryer. Then a melamine resin layer (solids content: 55% by weight) is applied in a quantity of 25 g/m². This also contains the usual additives. A melamine resin is also applied to the underside of the board using a roller application unit (application quantity: 50 g resin fl./m², solids content: approx. 55 wt %). Again, the board is dried in a circulating air dryer.

Then a melamine resin is applied to the surface of the board, which also contains glass beads. These have a diameter of 60-80 μm. The application quantity of the resin is approx. 20 g melamine resin fl./m² (solids content: 61.5 wt %). In addition to the hardener and the wetting agent, the formulation also contains a release agent. The application quantity of glass beads is approx. 3 g/m². A melamine resin is also applied to the underside of the board with a roller application unit (application quantity: 40 g resin fl./m², solids content: approx. 55 wt %). The board is again dried in a circulating air dryer and then coated again with a melamine resin containing glass beads. Another component is cellulose (Vivapur 302). Again, approx. 20 g melamine resin fl./m² (solids content: 61.6 wt %) are applied. Again, approx. 3 g glass beads and 0.25 g cellulose/m² are applied. In addition to the hardener and the wetting agent, the formulations also contain a release agent. A melamine resin is also applied to the underside of the board using a roller application unit (application quantity: 30 g resin fl./m², solids content: approx. 55% by weight). The resin is again dried in a circulating air dryer and then the board is pressed in a short-cycle press at 200° C. and a pressure of 400 N/cm². The pressing time was 10 seconds. A press plate with a wooden structure was used as the structure generator.

EXAMPLE 4: PRINTING A BOARD WITH POWDER OVERLAY

In a production line, 8 mm HDF is separated, cleaned of dust with the help of brushes and then transported further via roller conveyors.

In an application device, they are then coated with melamine resin powder in an amount of 25 g/m² using tribo guns. The melamine resin powder contained the usual auxiliary materials such as hardeners, release agents, etc. The powder is then melted-on by infrared radiation.

Afterwards, the base coated panel is coated with a colour base coat in multiple coats with subsequent intermediate drying (circulating air). The colour base coat is a mixture of casein and pigment (titanium dioxide). The application quantity per coat is approx. 5 g fl./m². The application is repeated at least five times. This is followed by the application of a primer (application quantity: 10-20 g fl./m²) with circulating air drying.

Afterwards, the panel is printed with a digital printer using the aqueous CRYK ink. The application rates of ink are 3 to 15 g fl./m². The ink is dried via IR radiation or circulating air.

Corundum is sprinkled onto the print with a sprinkling device (application quantity: 20 g corundum/m², F 180).

Afterwards, melamine resin powder is again applied with a tribo gun (application quantity: 80 g/m²). This melamine resin powder is again gelled with the help of an IR radiator. The melamine resin powder contained the usual additives such as hardener, release agent, etc.

The board is then pressed in a KT press together with a counter-impregnate. The pressing conditions were: T=200° C., p=40 kg/cm² and t=25 sec. The pressed panel was then visually inspected and no abnormalities were found. The surface tests subsequently carried out in accordance with DIN EN 15468—August 2018 also showed no abnormalities. All requirements of stress class 32 were met.

The invention claimed is:

1. A method for producing at least one carrier material provided with a printed decoration, wherein the printed decoration is applied to the at least one carrier material by means of digital printing,
wherein the water-soluble CRYK ink used for digital printing has the following composition:
colour component C comprises at least one cyan pigment;
colour component K comprises at least one black carbon pigment;
colour component R comprises a mixture of two different red pigments, a first red pigment and up to 60% by weight, based on the colour component R, of a second red pigment; and
colour component Y comprises a yellow pigment, a mixture of at least two different yellow pigments, or a mixture of at least one yellow pigment and at least one red pigment,
wherein the colour component Y is a mixture of two yellow pigments and a red pigment,
the colour component Y is a mixture of two different yellow pigments, a first yellow pigment and up to 30% by weight, based on the colour component Y, of a second yellow pigment,
the colour component Y is a mixture of a yellow pigment and up to 10% by weight, based on the colour component Y, of a red pigment, or
the colour component Y is a mixture of a first yellow pigment, up to 20% by weight, based on the colour component Y, of a second yellow pigment and up to 10% by weight of a red pigment.

2. The method according to claim 1, wherein the ink is free of an orange colour pigment.

3. The method according to claim 1, wherein the at least one cyan pigment is a copper phthalocyanine pigment and/or wherein the black carbon pigment is a carbon black pigment.

4. The method according to claim 1, wherein the water content in the ink is at least 50%.

5. The method according to claim 1, wherein the ink contains at least one organic solvent in a proportion of less than 45%.

6. The method according to claim 1, wherein the at least one carrier material to be printed is at least one raw paper, at least one pre-treated, impregnated paper or at least one material board.

7. A method for producing at least one carrier material provided with a printed decoration, wherein the printed decoration is applied to the at least one carrier material by means of digital printing, wherein the water-soluble CRYK ink used for digital printing has the following composition:
   colour component C comprises at least one cyan pigment;
   colour component K comprises at least one black carbon pigment;
   colour component Y comprises a mixture of two different yellow pigments, a first yellow pigment and up to 30% by weight, based on the colour component Y, of a second yellow pigment; and
   colour component R comprises a red pigment a mixture of at least two different red pigments, or a mixture of at least one red pigment and at least one yellow pigment,
   wherein the colour component R is a mixture of two red pigments and a yellow pigment,
   the colour component R is a mixture of two different red pigments, a first red pigment and up to 60% by weight, based on the colour component R, of a second red pigment, or
   the colour component R is a mixture of a red pigment selected from the group consisting of quinacridone pigments, and a yellow pigment.

8. A method for producing at least one carrier material provided with a printed decoration, wherein the printed decoration is applied to the at least one carrier material by means of digital printing,
   wherein the water-soluble CRYK ink used for digital printing has the following composition:
   colour component C comprises at least one cyan pigment; and
   colour component K comprises at least one black carbon pigment; and
   Condition A: colour component Y comprises: a yellow pigment, a mixture of at least two different yellow pigments, or a mixture of at least one yellow pigment and at least one red pigment, and colour component R comprises a mixture of at least one red pigment and at least one yellow pigment, or Condition B: colour component Y comprises a mixture of at least one yellow pigment and at least one red pigment, and colour component R comprises: a red pigment, a mixture of two red pigments; or a mixture of at least one red pigment and at least one yellow pigment.

9. The method according to claim 8, wherein, in Condition A or Condition B, the colour component Y is a mixture of a yellow pigment and a red pigment or a mixture of two yellow pigments and a red pigment.

10. The method according to claim 8, wherein, in Condition A or Condition B, the colour component Y is a mixture of a yellow pigment and up to 10% by weight, based on the colour component Y, of a red pigment.

11. The method according to claim 8, wherein, in Condition A or Condition B, the colour component Y is a mixture of a first yellow pigment, up to 20% by weight, based on the colour component Y, of a second yellow pigment and up to 10% by weight of a red pigment.

12. The method according to claim 8, wherein, in Condition A or Condition B, the colour component R is a mixture of a red pigment and a yellow pigment or mixture of two red pigments and a yellow pigment.

13. The method according to claim 8, wherein, in Condition A or Condition B, the colour component R is a mixture of a mixture of a red pigment selected from the group consisting of quinacridone pigments, and a mixture of yellow pigments PR207 and PY181.

14. The method according to claim 8, wherein the ink is free of an orange colour pigment.

15. The method according to claim 8, wherein the at least one cyan pigment is a copper phthalocyanine pigment and/or wherein the black carbon pigment is a carbon black pigment.

16. The method according to claim 8, wherein the water content in the ink is at least 50%.

17. The method according to claim 8, wherein the ink contains at least one organic solvent in a proportion of less than 45%.

18. The method according to claim 8, wherein the at least one carrier material to be printed is at least one raw paper, at least one pre-treated, impregnated paper or at least one material board.

* * * * *